(12) United States Patent
Brinsmade

(10) Patent No.: US 6,216,984 B1
(45) Date of Patent: Apr. 17, 2001

(54) GRAVITY HABITAT MODULE FOR SPACE VEHICLE

(76) Inventor: Akbar F. Brinsmade, No. 7 Holly Corner, The Oaks, Diamondhead, MS (US) 39525

(*) Notice: Subject to any disclaimer, the term of this patent is extended or adjusted under 35 U.S.C. 154(b) by 0 days.

(21) Appl. No.: 09/419,341

(22) Filed: Oct. 15, 1999

(51) Int. Cl.[7] .................................................. B64G 1/00
(52) U.S. Cl. ................................. 244/159; 244/162
(58) Field of Search .............................. 244/162, 163, 244/159

(56) References Cited

U.S. PATENT DOCUMENTS

| | | | |
|---|---|---|---|
| 3,073,040 | 1/1963 | Schueller | 434/34 |
| 3,169,725 | * 2/1965 | Berglund | 244/159 |
| 3,210,026 | * 10/1965 | Frisch | 244/159 |
| 3,675,879 | 7/1972 | Fuchs | 244/163 |
| 3,749,332 | 7/1973 | Gray | 244/163 |
| 4,057,207 | * 11/1977 | Hogan | 244/159 |
| 4,643,375 | 2/1987 | Allen | 244/159 |
| 5,302,130 | 4/1994 | Sieving | 434/55 |
| 5,580,013 | 12/1996 | Velke | 244/159 |

* cited by examiner

Primary Examiner—J. Woodrow Eldred
(74) Attorney, Agent, or Firm—David L. Ray

(57) ABSTRACT

A habitat module for astronauts traveling in a space vehicle, the habitat module including a cylindrical module enclosing a living compartment for astronauts, the module having a cylindrical outer wall, opposite end walls, and a longitudinal central axis, support bearings mounting the module within the space vehicle for rotation of the module about its longitudinal central axis to create artificial gravity within the module for astronauts occupying the module, a first motor rigidly connected to the space vehicle for rotating the module, a flywheel rotatably connected to the space vehicle adjacent to the module to counter and cancel the inertial forces generated when the module is rotated about the longitudinal central axis of the module, the flywheel having a central longitudinal axis of rotation aligned with the central axis of rotation of the module, a second motor rigidly connected to the space vehicle for rotating the flywheel to counter and cancel the inertial forces generated when the module is rotated, and access and egress openings through the cylindrical outer wall of the module to permit the passage of astronauts between the interior of the space vehicle and the module.

4 Claims, 5 Drawing Sheets

GRAVITY HABITAT MODULE FOR SPACE VEHICLE

BACKGROUND OF THE INVENTION

1. Field of the Invention

The invention relates to space vehicles. In particular, the invention relates to provision of artificial gravity in space vehicles.

2. Description of the Related Art

Since Isaac Newton enunciated his laws of motion and gravitation, humanity has been aware that all humans are bound to Earth by a force called gravity. Upon achieving powered flight in the twentieth century, it became evident that the magnitude of the force of gravity upon a human being in an aircraft flight can reach many times the force of gravity on Earth's surface or ground level, and in some conditions, even lower than the force of gravity at ground level. Also in the twentieth century, man has achieved flight in Earth orbit and in space beyond Earth. In these environments, and depending upon space flight conditions, man is exposed to gravity forces which can vary, from many times Earth's surface gravity to infinitesimally low fractions thereof, referred to herein as "microgravity" or simply "zero gravity". Microgravity normally prevails in a space vehicle during cruising flight, that is, when flight thrust or attitude control forces are not being applied to the space vehicle.

Man has developed in a ground level environment since his remote origins, so it is not surprising that his body systems are unable to function undisturbed when in microgravity environments encountered in space travel. Affected are the skeletal, muscular, cardiovascular, nervous and sundry other body systems, as also their physiological processes. The severity of the various afflictions is a function of the length of time of exposure. It is known in the art that after only half-dozen days in Earth orbit, astronauts lose about one percent of their biomass. Physical weakness is normally experienced by astronauts after their return to Earth. Thereafter recovery is achieved after suitable treatment, evidence of the deleterious nature of microgravity on the human body and the necessity for developing effective countermeasures if man is to succeed in long duration space travel over periods encompassing months or even years.

Exemplary of Patents of the related Prior Art are the following U.S. Pat. Nos. 3,073,040; 3,675,879; 3,749,332; 4,643,375; 5,580,130; and 5,302,013.

Recognition of the deleterious effect on human body systems due to a microgravity environment in space flight came early. The problem continues to be what to do about it. Essentially, countermeasures have been considered for space vehicle design and through body exercise performed by astronauts in space flight. The various routines of body exercise performed by astronauts during space flight have not arrested the problems of microgravity, and only marginally reduced its severity. Expectations remain that drugs some day will be discovered which avoid any damage to astronauts from microgravity.

Some suggested vehicle design features to counter microgravity by producing artificial gravity provide for the rotation of the entire space vehicle in various ways. However, when the entire space vehicle is spinning, provision of forward thrust for vehicle propulsion becomes complex in design and execution.

For a trip to Mars, which may last in excess of ten months in transit one way, it has been suggested to revolve a vehicle containing astronauts and a rocket engine module, each a either end of a long and rigid beam or "tether".

Another suggestion has been to use a vehicle geometry equivalent to a doughnut or tire inner tube. All of the crew of astronauts would be confined within this toroidal enclosure spinning at the required rate to achieve the desired artificial gravity. Non-living components would be located within the space toward the axis of rotation of the toroidal space vehicle. Propulsion engines would be aligned parallel to or coincident with the axis of rotation, at the point of a vehicle which would resemble a large spinning top. An alternate arrangement for the propulsion engines for the spinning toroid would be to use at the rotational axis a main axle for the toroidal "wheel". At either end of this axle, and perpendicular to it, would be the propulsion engines to provide a balanced thrust. The whole vehicle thus would resemble a single rotating wheel with "handles" attached at either end of its axle, in the manner of a wheelbarrow.

The fictional but popular "flying saucer" is a prototypical space vehicle, provided not only with propulsion capabilities but with the avoidance of microgravity problems or countermeasures.

Actual experience in microgravity countermeasures is very limited at the present time. Various routines of body exercise performed by astronauts during space flight only marginally reduces the severity of damage to the body caused by long-term exposure to microgravity environments.

There is no known experimental data on human subjects that can be used as a guide to determine the critical unknowns of the human threshold of microgravity tolerance, and therefore the magnitude, duration, and cycling frequency of artificial gravity to supply to prevent microgravity damage to astronauts. Experimental programs in space to test the variables of artificial gravity for arresting microgravity damage are essential to assure the success of long-term space missions such as manned trips to Mars.

It is thus recognized that damage to skeletal, muscular, cardiovascular and other systems of the body of an astronaut occurs when engaged in space flight, where microgravity is encountered.

It is an object of the present invention to provide a mechanism for producing artificial gravity for individuals in microgravity space environments at levels necessary to arrest any potential body damage.

It is an additional object of the present invention to provide artificial gravity to a module or modules in a space vehicle containing one or more astronauts, rather than providing artificial gravity to the space vehicle as a whole.

SUMMARY OF THE INVENTION

In accordance with the present invention, there is provided a module for carrying astronauts in a space vehicle which induces artificial gravity for the astronauts carried therein. The modules of the invention are preferably a habitat for two or more individuals, in privacy or in common. The two individuals for whom artificial gravity is provided may be occupied in all manner of passive and active flight activities within the confines of the module for which artificial gravity is provided, which is sometimes referred to hereafter as a "gravity module". Artificial gravity may be provided to the gravity module for long periods of time during space travel, such as months or years.

The habitat module of the invention includes a cylindrical module enclosing a living compartment for astronauts, the module having a cylindrical outer wall, opposite end walls, and a longitudinal central axis, support bearings mounting the module within the space vehicle for rotation of the module about the longitudinal central axis to create artificial gravity within the module for astronauts occupying the module, a first motor rigidly connected to the space vehicle for rotating the module, a flywheel rotatably connected to the space vehicle adjacent to the module to counter and cancel the inertial forces generated when the module is rotated about the longitudinal central axis of the module, the flywheel having a central longitudinal axis of rotation aligned with the central axis of rotation of the module, a second motor rigidly connected to the space vehicle for rotating the flywheel to counter and cancel the inertial forces generated when the module is rotated, and, for each astronaut compartment, an entrance opening through the cylindrical outer wall of the module to permit the passage of the astronauts between the interior of the space vehicle and the module.

DESCRIPTION OF THE PREFERRED EMBODIMENTS

Figure 1:
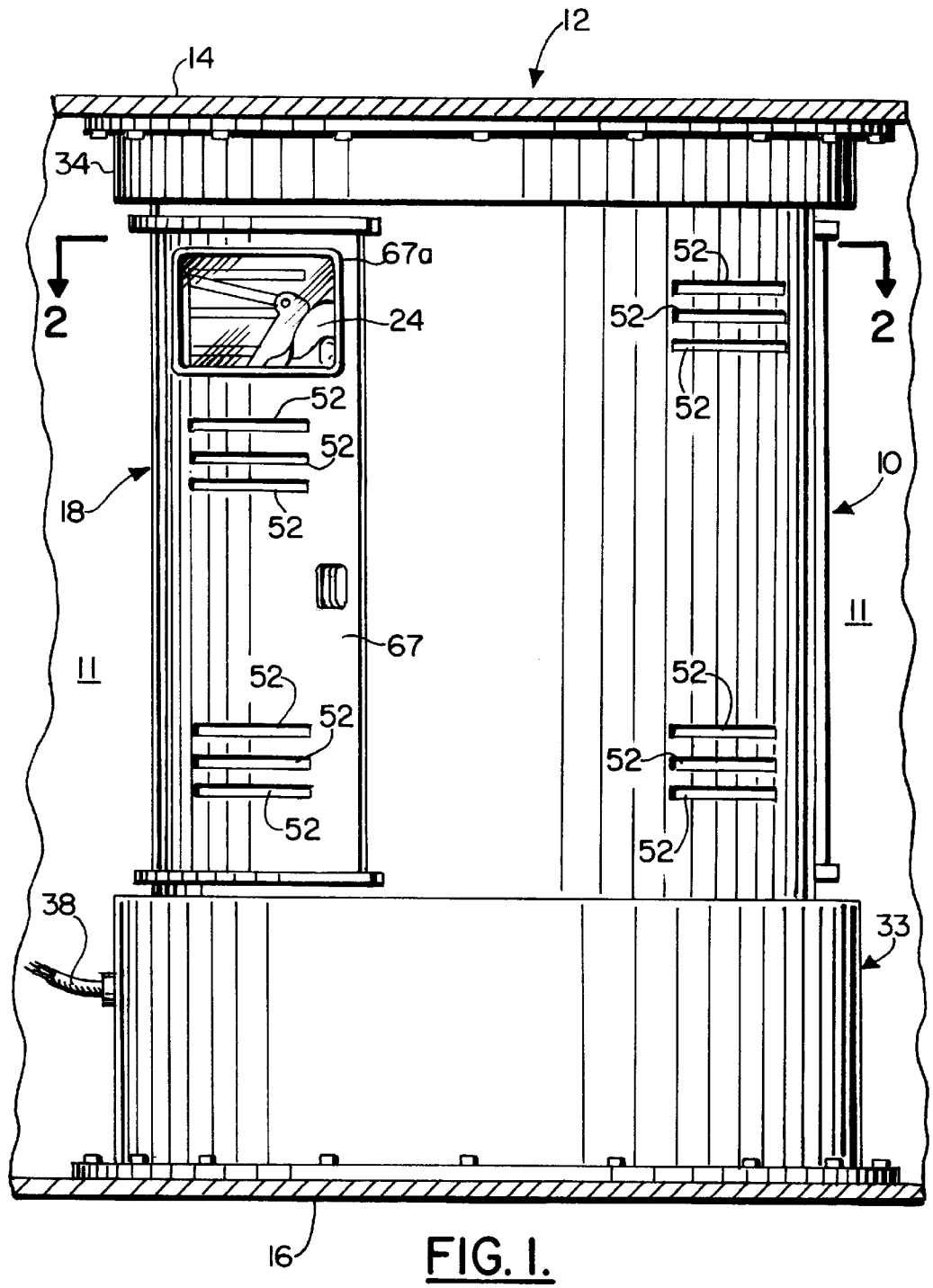
FIG. 1 is a side elevational view of one of the space vehicle modules of the invention which provide artificial gravity for astronauts therein.
Figure 2:
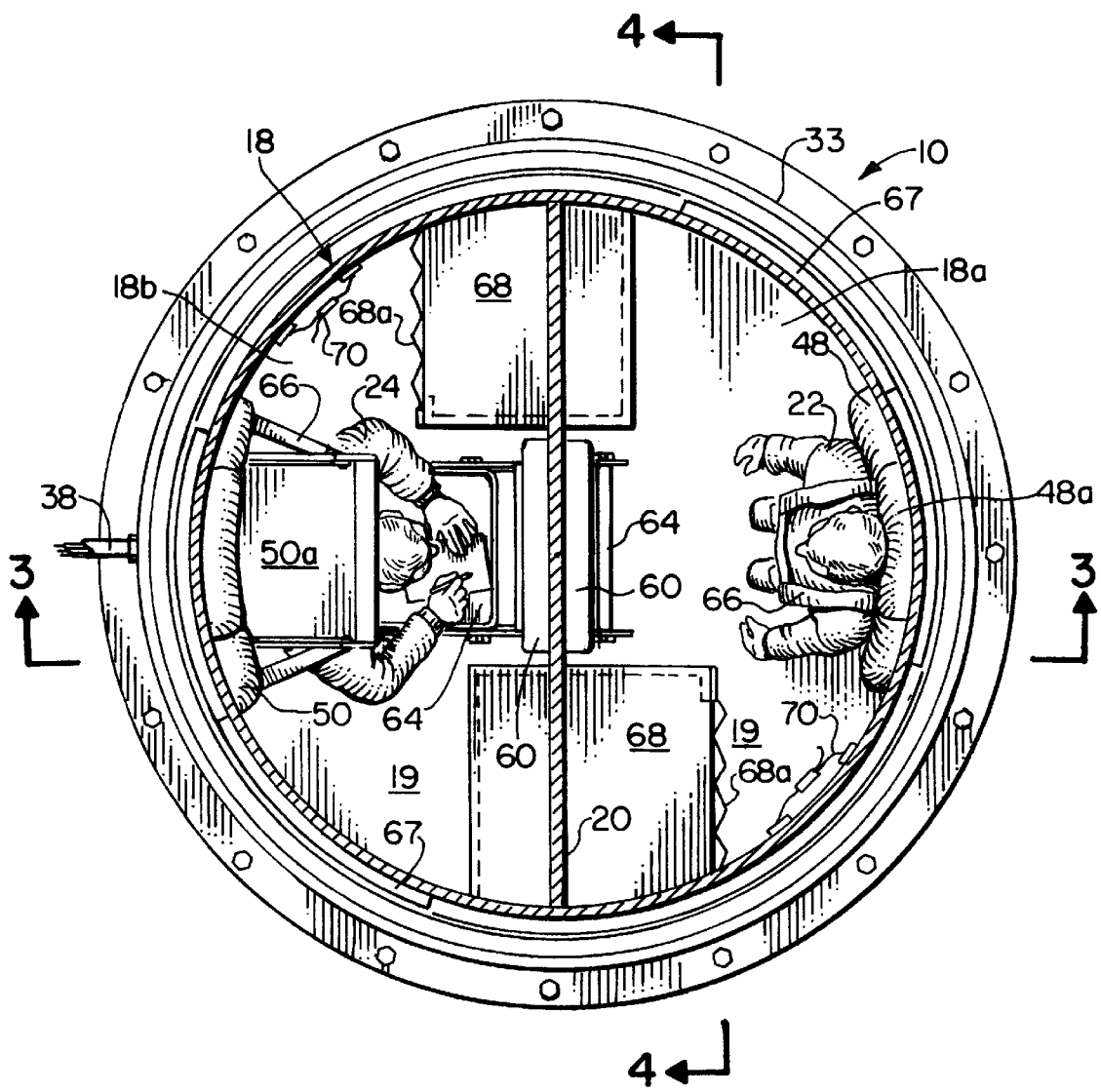
FIG. 2 is a cross-sectional view of the space vehicle module of FIG. 1 taken along line 2—2 of FIG. 1.

Referring now to the drawings, in FIGS. 1–7 is shown the gravity habitat module assembly of the present invention generally indicated by the numeral 10. Module 10 is rigidly connected to the interior of a space vehicle generally indicated by the numeral 12 having a cylindrical hull 13 shown in FIGS. 1–7 and two circular end walls 14 and 16. Module assembly 10 inside space vehicle 12 is rigidly connected to circular end walls 14 and 16.

Module assembly 10 has a generally cylindrical rotatable living quarters or habitat module generally indicated by the numeral 18 which rotates around the central longitudinal axis of module 18. Habitat module 18 has a circular floor 19 and circular ceiling 19a rigidly connected thereto. Dimensions of habitat module 18 are preferably about six feet in diameter by about seven feet in length, divided lengthwise by rectangular interior wall 20 into two identical compartments 18a and 18b.

For each astronaut, the habitat module 18 provides a personal and private environment under essential gravity conditions, during both passivity (sleep, rest, relaxation, leisure, study, meals) and activity (desk, work, physical exercise) of the astronaut. Necessarily, required flight activities outside the space vehicle and in other space vehicle areas will be performed external to and without benefit from the habitat module 18.

The level of gravity required by the astronauts 22 and 24 within module 18 is available at the periphery of module 18 by steady rotation of module 18 by motor 26 and drive gear 26a, which engage and drive ring gear 28. Drive ring gear 28 is rigidly connected to floor 19. Preferably, motor 26 is an electric motor. However, motor 26 may be electrical, pneumatic or hydraulic, and may be provided with variable speed controls for driving and varying the speed of rotation of module 18 and the artificial gravity provided therein.

Habitat module 18 is rotatably supported by a ball bearing generally indicated by the numeral 30 which engages the periphery of module 18 adjacent to floor 19 and by a ball bearing generally indicated by the numeral 32 which engages the periphery of module 18 adjacent to ceiling 19a.

The inner race 30a of bearing 30 is rigidly connected to the outer surface of module 18 adjacent to floor 19, and the inner race 32a of bearing 32 is rigidly connected to the outer surface of module 18 adjacent to ceiling 19a. Thus, bearings 30 and 32 prevent upward or downward movement of module 18 relative to circular end walls 14 and 16. The outer race 30b of bearing 30 is rigidly connected to the lower module support ring generally indicated by the numeral 33, and the outer race 32b of bearing 32 is rigidly connected to upper module support ring 34. Module support ring 33 is rigidly connected to the inside of circular end wall 16, and module support ring 34 is rigidly connected to the inside of circular end wall 14.

Figure 3:
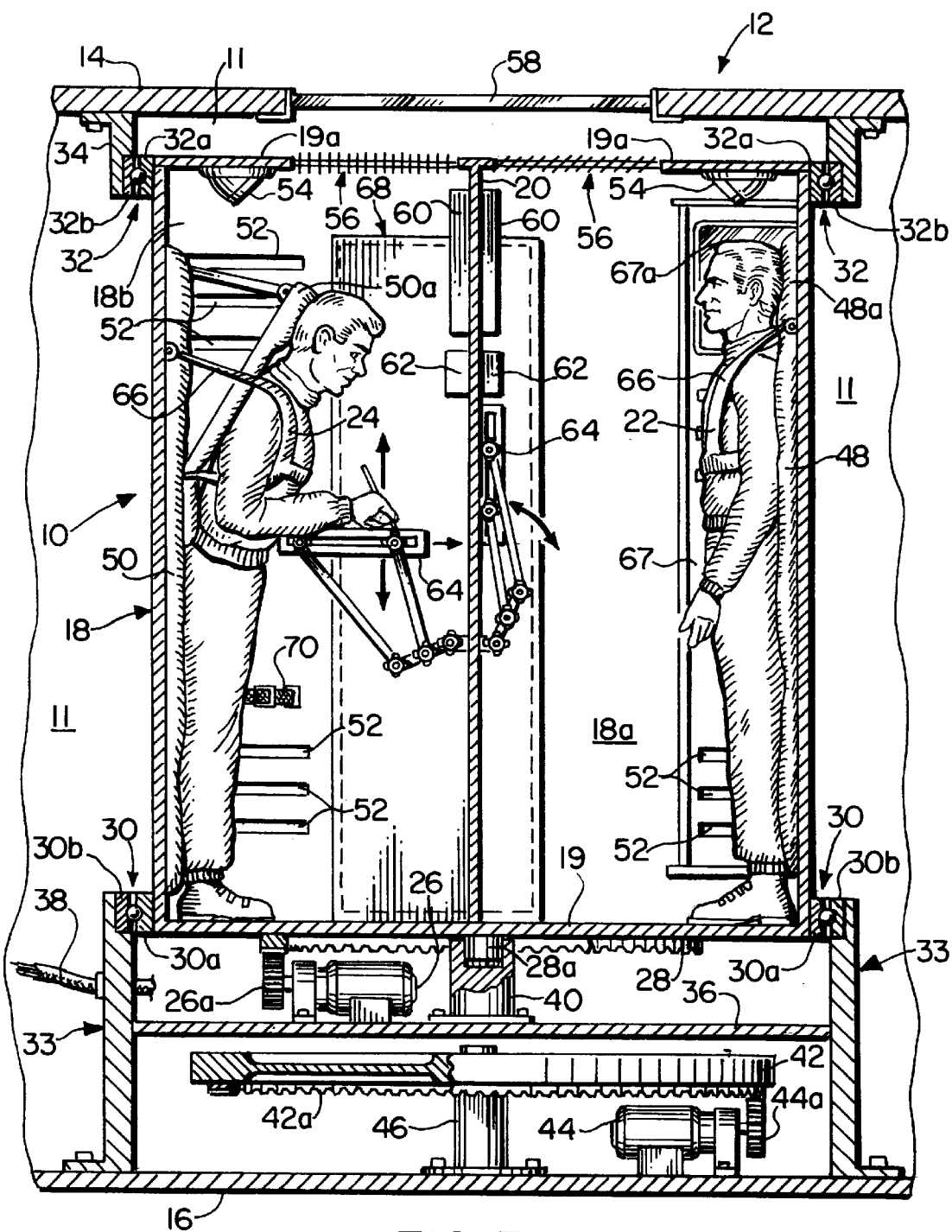
FIG. 3 is a cross-sectional view of the space vehicle module of FIG. 1 and 2 taken along line 3—3 of FIG. 2.
Figure 4:
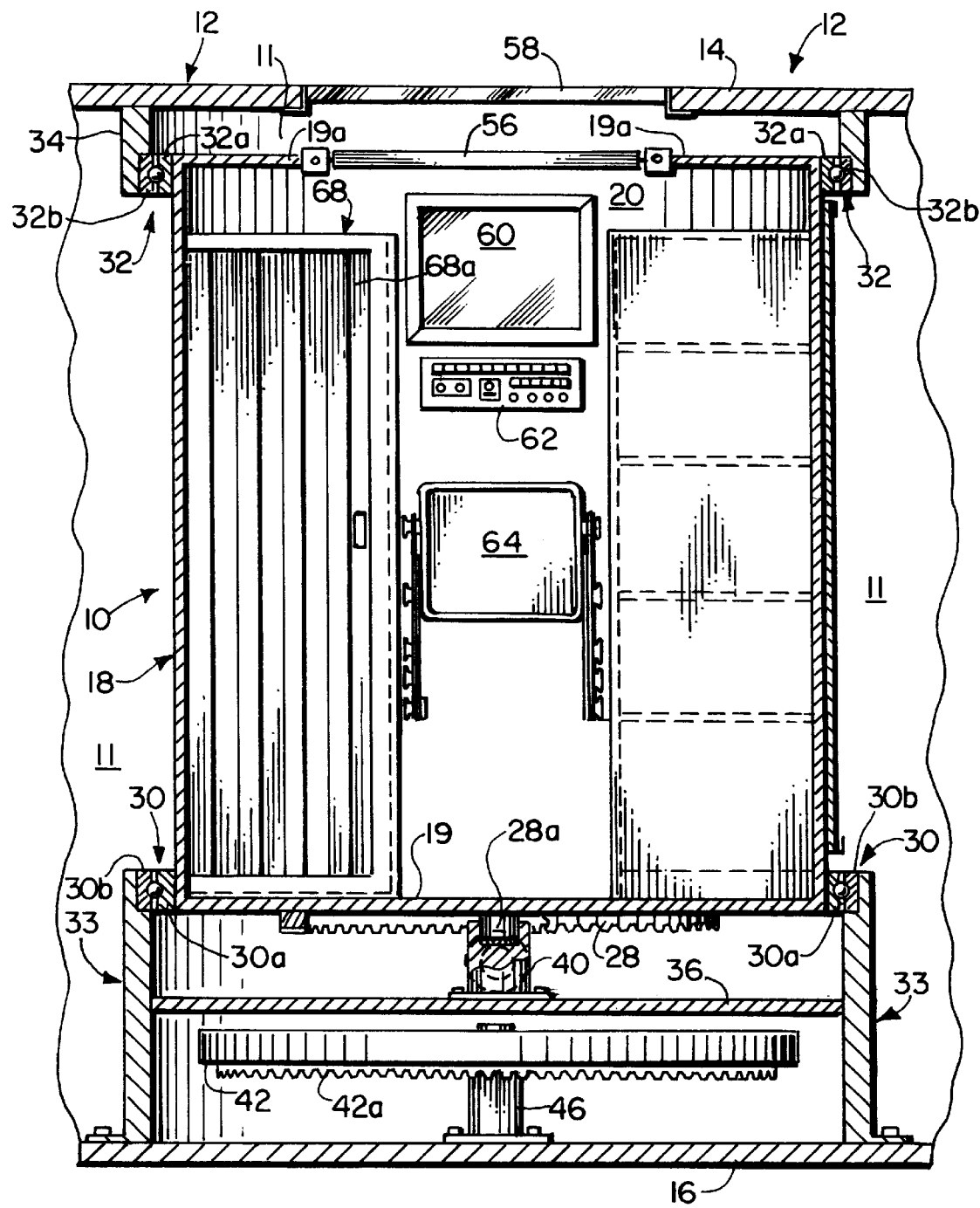
FIG. 4 is a cross-sectional view of the space vehicle module of FIG. 1 and 2 taken along line 4—4 of FIG. 2.

Motor 26 is connected to a circular plate 36 which is rigidly connected to the inside wall of module support ring 33 as shown in FIGS. 3 and 4. A cable 38 containing electrical wires for providing energy to motor 26 and other electrical equipment extends through module support ring 33.

Drive ring gear 28 has a central cylindrical shaft 28a which with the cylindrical pedestal 40 constitute the longitudinal bidirectional thrust bearing (not shown in detail). Cylindrical pedestal 40 is rigidly connected to circular plate 36.

It is very important to counter the rotation of module 18 about its longitudinal central axis to prevent the entire space vehicle 12 from rotating or being moved by the inertial forces created by the rotation of module 18 in space. To counter the rotational inertia of rotating module 18, a flywheel 42 is rotatably connected to circular wall 16 beneath circular plate 36. Flywheel 42 is selected to have a moment of inertia sufficient to counter and cancel the inertial forces caused by the angular acceleration and rotation of module 18 with one or more astronauts therein. Flywheel 42 is rotated in the opposite angular direction to the direction of the angular rotation of module 18 by motor 44 and drive gear 44a, which engage teeth 42a on flywheel 42. Flywheel 42 is rotatably connected to pedestal 46 through a rotating bearing (not shown in detail). Pedestal 46 is rigidly connected to circular wall 16. Flywheel 42 has a central longitudinal axis which is aligned with the central longitudinal axis of module 18 to enable flywheel to precisely counter the inertial forces generated when module 18 is rotated to provide artificial gravity in module 18. Preferably, motor 44 is an electric motor. However, motor 44 may be electrical, pneumatic or hydraulic, and may be provided with variable speed controls for driving and varying the speed of rotation of flywheel 42 precisely to counter the rotational inertia of rotating module 18.

Inasmuch as artificial gravity in rotating module 18 is directed radially outward uniformly around the whole circumference of module 18, astronauts 22 and 24 within do not stand on their feet but are recumbent on mattresses 48 and 50, respectively. Mattresses 48 and 50 are connected to the inside walls of module 18. Each mattress 48 and 50 has an adjustable pillow 48a and 50a, respectively, adjacent thereto connected to the inside of module 18.

Temperature and humidity conditions are controlled from the interior of space vehicle 12, through suitable vents 52 in module 18. Lamps 54 in the ceiling 19a furnish interior lighting. Shutter-blinds 56 overhead allow viewing out into space through a transparent external vehicle window 58, though of course the view will rotate as module 18 rotates. On the wall 20 is a flat television screen 60 for each astronaut to provide multi-screen viewing communication, computer monitoring, and video entertainment. All necessary controls are on panels 62 in front of each astronaut, and a folding desk/table 64 connected to wall 20 beneath panels 62. A loosely fitting harness 66 connected to wall 18 is provided for the safety of each astronaut during powered flight.

A sliding access door 67 having window 67a is provided in module 18 to the right of each astronaut. A belt 70 to the left of each astronaut is connected to the inside of module 18 to support and secure loose clothing or implements.

A closet generally indicated by the numeral 68 is provided for each astronaut. Each closet is provided with folding-sliding doors 68a. The closet contains all personal belongings (clothing, personal hygiene items, books, entertainment, etc.), working gear and equipment, food and meal utensils, utilies for personal hygiene, and temporary storage of waste materials. The closet preferably is provided with shelves, partitions, drawers, pockets, stays, straps, belts, and holders (not shown) to stabilize and secure closet contents under all modes of space vehicle flight and rotation of module 18.

Electrical and electronic transmission into and out of the module 18 is through connections between stationary and rotating system elements as is known in the art such as commutator type switches (carbon brushes on rotating copper rings held on suitably insulated supports).

Figure 5:
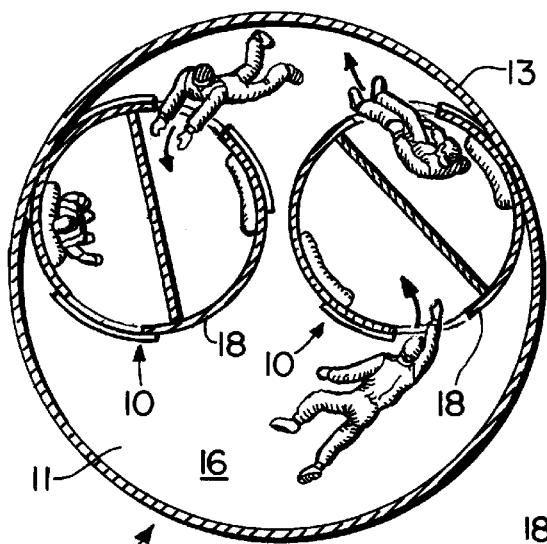
FIG. 5 is a schematic view of two of the space vehicle modules of the invention located inside a space vehicle with astronauts moving therebetween.

In FIG. 5 is shown a first arrangement of two module assemblies 10 having the habitat modules 18 therein in the enclosed interior 11 of a space vehicle 12. The module assemblies 10 are connected to one side off of the center diameter of the interior 11 of space vehicle 12. To enter or leave a module 18, rotation of the module 18 is stopped, and the doors 67 are opened. After the astronauts enter each module 18, the doors 67 are closed and rotation is begun to achieve the desired artificial gravity therein.

Figure 6:
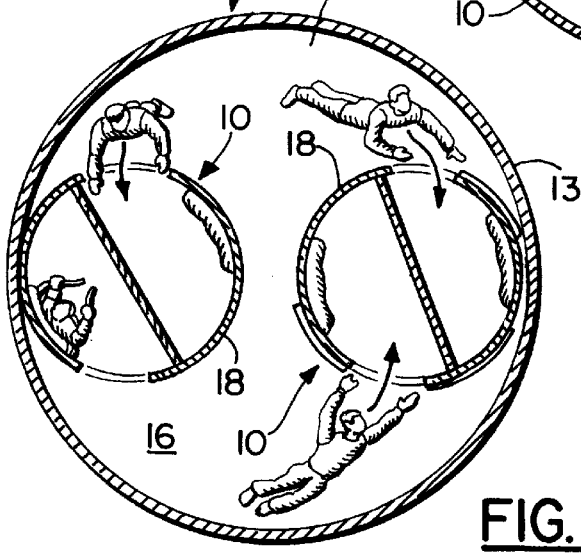
FIG. 6 is a schematic view of an alternate location of two of the space vehicle modules of the invention located inside a space vehicle with astronauts moving therebetween.

In FIG. 6 is shown a second arrangement of two module assemblies 10 having the habitat modules 18 therein in the enclosed interior 11 of a space vehicle 12. The module assemblies 10 are connected to each side along the center diameter of the interior 11 of space vehicle 12. To enter or leave a module 18, rotation of the module 18 is stopped, and the doors 67 are opened. After the astronauts enter each module 18, the doors 67 are closed and rotation is begun to achieve the desired artificial gravity therein.

Figure 7:
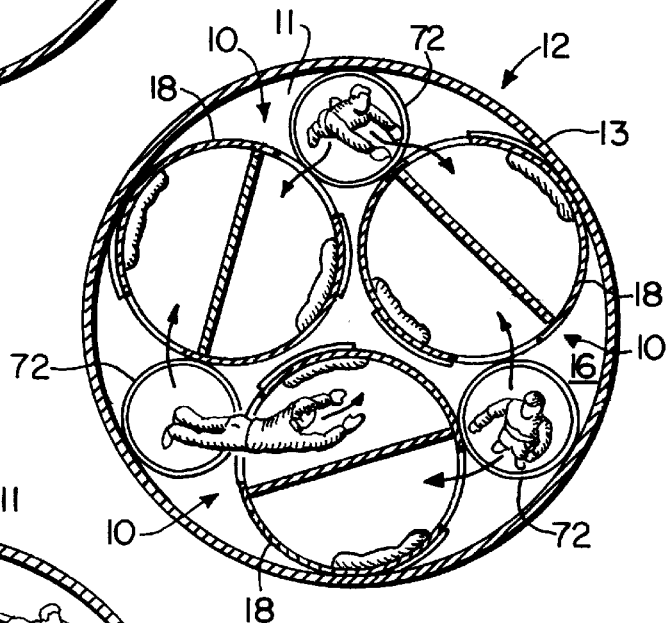
FIG. 7 is a schematic view of an additional embodiment of the invention wherein three of the space vehicle modules of the invention are located inside a space vehicle with astronauts moving therebetween.

In FIG. 7 is shown a third arrangement of three module assemblies 10 having the habitat modules 18 therein in the enclosed interior 11 of a space vehicle 12. The module assemblies 10 are connected to each side equidistantly around the interior 11 of space vehicle 12. To enter or leave a module 18, rotation of the module 18 is stopped, and the doors 67 are opened. After the astronauts enter each module 18, the doors 67 are closed and rotation is begun to achieve the desired artificial gravity therein. Manways 72 may be optionally provided to provide assistance to the astronauts maneuvering between each module 18.

Installation of one or more modules 10 in a space vehicle such as space vehicle 12 presents little or no special difficulty, particularly for the Earth Space Station now under construction and assembly in Earth Orbit. This station has fourteen foot diameter components enabling modules 18 having a diameter of six feet to be accommodated in various arrangements as shown in FIGS. 5–7.

For convenience of the astronauts in module 18, orientation of the major axis of rotation of module 18 in relation to the major axis aligned with the direction of acceleration or thrust of the space vehicle 12 needs to be considered. If both of the two longitudinal axes are parallel during powered flight, which is the preferred configuration, the astronauts essentially will be in a sitting or standing position. If the two axes are mutually perpendicular, the astronauts will be in a prone position. If otherwise askew, the astronauts will be in a discomforting attitude which could cause physical harm.

The module assembly 10 and module 18 of the invention provide artificial gravity in reduced gravity or microgravity environments. Artificial gravity is achieved by using rotating cylinders, modules 18, of optimized dimensions relative to the space vehicle 12 and ergonomic dimensions relative to their occupants, modules within which one, two, or a group of astronauts may conduct the major share of their working and/or life activities, both passive and active, during their space flight or space sojourn, especially for long terms, extending over periods of months or even years.

There is one critical unknown that must be resolved before the afflictions due to a microgravity environment can be properly arrested by the provision of artificial gravity in space environments and space travel. That unknown is the magnitude, duration, and cycling frequency of artificial gravity to provide to an astronaut in a given microgravity environment. There is little experimental evidence.

Although the preferred embodiments of the invention have been described in detail above, it should be understood that the invention is in no sense limited thereby, and its scope is to be determined by that of the following claims:

What is claimed is:

1. In a space vehicle having an interior subject to microgravity when in space flight, a habitat module for astronauts comprising:

a. a cylindrical module enclosing a living compartment for astronauts, said module having a cylindrical outer wall, opposite end walls, and a longitudinal central axis, b. rotation and thrust support bearings mounting said module within said space vehicle for rotation of said module about said longitudinal central axis to create artificial gravity within said module for astronauts occupying said module, c. a first motor rigidly connected to said space vehicle for rotating said module, d. a flywheel rotatably connected to said space vehicle adjacent to said module is rotated about the said longitudinal central axis of said module, said flywheel having a central longitudinal axis of rotation aligned with the central axis of rotation of said module, said flywheel rotating in an angular direction opposite to the rotation of said module, said flywheel having a moment of inertia sufficient to counter or cancel the inertial forces created when said module is rotated, said longitudinal axial dimension of said module being greater than the height of any astronaut occupant of said module to permit said astronaut to be in a recumbent attitude parallel to said longitudinal central axis along said cylindrical outer wall of said module, e. a second motor rigidly connected to said space vehicle for rotating said flywheel to counter and cancel the inertial forces generated when said module is rotated, and f. access and egress openings through said cylindrical outer wall of said module permit the passage of astronauts between said interior of said space vehicle and said module, a partition wall extending diametrically and substantially the full length of said module to divide said module into two identical compartments, said access and egress openings permitting passage of an astronaut into and out of each of said compartments from and to the exterior of said module.

2. The habitat module of claim 1 wherein a partition wall extends diametrically and substantially the full length of said module to divide said module into two identical compartments, said access and egress openings permitting passage of an astronaut into and out of each of said compartments from and to the exterior of said module.

3. The habitat module of claim 2 wherein each of said compartments is provided with a mattress extending longitudinally along the cylindrical outer wall of said module for providing support for an astronaut therein when said module is being rotated to produce artificial gravity.

4. The habitat module of claim 3 wherein said partition wall is provided for each of said compartments with a television monitor, a control panel, a foldable desk, and a closet.

* * * * *